US008111714B2

United States Patent
Melsen et al.

(10) Patent No.: US 8,111,714 B2
(45) Date of Patent: Feb. 7, 2012

(54) METHOD AND ARRANGEMENT RELATING TO ADMISSION CONTROL OF BROADBAND SERVICES

(75) Inventors: Torben Melsen, Holstebro (DK); Mats Forsman, Rönninge (SE); Tomas Thyni, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 251 days.

(21) Appl. No.: 12/441,439

(22) PCT Filed: Sep. 18, 2006

(86) PCT No.: PCT/SE2006/001064
§ 371 (c)(1), (2), (4) Date: Mar. 16, 2009

(87) PCT Pub. No.: WO2008/036006
PCT Pub. Date: Mar. 27, 2008

(65) Prior Publication Data
US 2009/0238200 A1  Sep. 24, 2009

(51) Int. Cl.
*H04J 3/16* (2006.01)
(52) U.S. Cl. ...................................................... 370/468
(58) Field of Classification Search .......... 370/229–240, 370/431, 437, 468, 477
See application file for complete search history.

(56) References Cited

U.S. PATENT DOCUMENTS

| 7,245,614 | B1 * | 7/2007 | Podar et al. | 370/389 |
|---|---|---|---|---|
| 7,535,831 | B2 * | 5/2009 | Phelps et al. | 370/228 |
| 7,684,334 | B2 * | 3/2010 | Shiokawa et al. | 370/236 |
| 2005/0220132 | A1 * | 10/2005 | Oman et al. | 370/432 |
| 2006/0109829 | A1 | 5/2006 | Alan O'Neill | |
| 2009/0052440 | A1 * | 2/2009 | Pfeffer et al. | 370/352 |

FOREIGN PATENT DOCUMENTS

| EP | 1 223 713 A2 | 7/2002 |
| EP | 1 701 489 A1 | 9/2006 |

* cited by examiner

*Primary Examiner* — Kwang B Yao
*Assistant Examiner* — Tung Q Tran

(57) ABSTRACT

A broadband access node and method for controlling access by end users to services over communication channels. A resource admission control mechanism includes a first memory for storing information about a currently available transmission capacity on an uplink channel, a second memory for storing information about a currently available transmission capacity on a downlink subscriber line; and a third memory for storing information about a currently available maximum performance of the access node. A fourth memory stores service-related information regarding the capacity and performance service requirements of respective services. A processor calculates whether the service requirements of a requested service fulfill given conditions in relation to currently available uplink/downlink capacity and currently available performance capability of the access node. Requests that fulfill the given conditions are granted while requests that do not fulfill the conditions are rejected.

24 Claims, 9 Drawing Sheets

METHOD AND ARRANGEMENT RELATING TO ADMISSION CONTROL OF BROADBAND SERVICES

TECHNICAL FIELD

The present invention relates to broadband access of services provided by service providers by means of a broadband access node adapted to provide end users with access to services over communication channels of given types and implementing resource admission control for controlling end user admission to resources. It also relates to a method for controlling end user access to resources in a broadband access network.

BACKGROUND

Many services are today provided using broadband access over a broadband access node in a broadband access network. Particularly provisioning broadband services based on IP/Ethernet multicast technology is of importance for the network architecture of service providers. For example an application for distribution of TV signals (IPTV) but also other applications such as distribution of radio (radio channels) and business information can benefit from the multicast distribution technology. Irrespectively of which broadband access network that is used, bottlenecks will be produced which limits the amount of multicast traffic in a network. Such bottlenecks can be produced at any locations, among others bottlenecks may easily be produced on links which have a limited available transmission bandwidth and in network nodes which for example only have a limited memory capacity allocated for handling multicast channels as well as limited multicast performance capability. Bottlenecks can also influence unicast traffic for example in networks carrying multicast as well as unicast traffic but also in networks only carrying unicast traffic. This means that broadband access networks have to be provided with a mechanisms aiming at ensuring a proper delivery and QoS of a subscribed service, particularly a multicast service, but also a unicast service.

As an example, if it is attempted to receive three TV channels each using for example 10 Mbps over a DSL (Digital Subscriber Line) with a capacity of 20 Mbps, the quality of the three data streams corresponding to the three TV channels will be impaired. In the following reference will mainly be made to multicast traffic since for such traffic the problems are more pronounced than for unicast traffic, even if they also are present for unicast traffic.

In order to provide a required QoS for multicast traffic, today normally the number of multicast channels per end user are limited. This is for example discussed in DLS Forum TR-101: "Migration to Ethernet-based DSL Aggregation", April 2006. However, different types of multicast channels require different amounts of transmission bandwidth. A HDTV channel typically requires 10 Mbps, whereas radio channels easily can be conveyed using only 64 kbps. The multicast resource admission control (RAC) as implemented today only provides a very coarse mechanism which does not take into account the properties of any individual multicast streams. An end user may be configured to receive only two multicast streams and there are no means to distinguish between a 10 Mbps HDTV channel and a 32 kbps radio channel, which will result in channels and resources being dropped unnecessarily. Furthermore, with today used techniques, to prevent bottlenecks, the utilization of network resources may, under certain circumstances be poor and there is no flexibility in allowing access to resources or services.

SUMMARY

It is therefore an object of the present invention to suggest a broadband access node which enables optimal utilization of the network resources. It is also an object to suggest a broadband access node through which access to services can be provided in a flexible manner. Still further it is an object to suggest a broadband access node through which bottlenecks can be prevented to a high extent and which increases the flexibility for the end user, for the service provider and for the access node operator. It is also an object to suggest a broadband access node which is cheap, simple and straightforward to implement and through which proper delivery and provisioning of the relevant QoS can be assured.

It is also an object of the invention to suggest a broadband access network through which one or more of the above mentioned objects can be achieved, as well as a method for controlling end user access over a broadband access network to services such that one or more of the above mentioned objects can be achieved.

Therefore a broadband access node adapted to provide end users with access to services over communication channels of given types is provided which comprises or communicates with resource admission control means for controlling end user admission to resources. The resource admission control means comprise a policy decision and enforcement function means comprising first information holding means for collecting and/or holding information about current available transmission capacity of the access node on the uplink, towards a service provider, second information holding means for collecting and/or holding information about current available downlink, or subscriber line, transmission capacity and third information holding means for collecting and/or holding information about current available performance of the access node. Furthermore service related information collecting and/or holding means are provided for, for each service or group or category of services, collecting or holding information about the performance requirements of the respective services or groups of services. Availability establishing means are provided for establishing if the performance requirements of a requested service fulfil a given condition or conditions in relation to current available uplink/downlink capacity and current available performance capability of the access node.

Still further the access node comprises or communicates with resource request decision means for, based on the outcome of the establishment in the availability establishing means with respect to said condition or conditions making a decision to grant or reject an end user resource request for access to a service.

The conditions may relate to not allowing exceeding of respective limits relating to different parameters comprising available uplink/downlink transmission capacity and one or more parameters relating to the performance capability of the access node. Additional information holding means may also provided for holding further performance related information or performance availability expressed in different manners, or other parameters.

The information holding means may be implemented as combined or separate information holding means. If they are combined, one or more of them may be combined in any appropriate manner. This can be implemented in many different ways. The first information collecting and/or holding means, irrespectively of how implemented, are particularly, in one embodiment, adapted to hold information about total available transmission capacity on the uplink and to collect (continuously as a resource is admitted or released) information relating to provided or allowed, i.e. already allowed, uplink capacity to establish the current available uplink transmission capacity. The second information collecting and/or holding means are particularly adapted to hold information about the total available transmission capacity on the downlink and to collect information relating to provided, i.e. already granted, uplink capacity to establish the current available downlink capacity, i.e. as the first (and third) information holding means, to keep updated information as to current available capacity by registering grant/release of resources. Still further, the third information holding means may be adapted to hold information about total available performance and to collect information relating to provided or already allowed amount of performance (in the appropriate terms) to establish the current available amount of performance, i.e. continuous control of granted and released performance capability.

It is alternatively possible to directly collect information about the current available capacity or capability instead of performing an action of calculating the current capability or capacity by using the original total capability or capacity and granted capacity or capability, for these or any other parameters. This can also be done in different manners, the relevant calculating or detecting means can be provided in association with the access node, the main thing being that somehow the current available capacity and performance capability etc. is established. The performance comprises information related to available bandwidth. The information relating to available bandwidth may comprise information about the number of IP packets per second and/or information about the number of available bits per time unit, for example per second. This means that also bandwidth considerations are taken into account, thus avoiding a situation, where a resource request only requiring a low bandwidth is rejected due to a limitation being based on the number of channels allowed for a particular user. This is extremely advantageous.

In one embodiment the performance information comprises information about the number of communication channels the access node is capable of handling simultaneously in addition to the bandwidth related performance information. Particularly the performance information comprises information about the maximum or current available amount of multicast traffic, for example expressed as a number of IP packets per second. The performance information may also (additionally or alternatively) comprise information about the maximum or current available amount of unicast traffic, particularly the maximum current amount of unicast traffic, for example expressed as the current maximum number of unicast IP packets per second.

The broadband access node may support multicast traffic as well as unicast traffic or only multicast traffic or only unicast traffic, in different embodiments. In a particular embodiment the performance information comprises information about the maximum number of multicast and/or unicast channels that the access node can handle as well. Generally the performance information comprises information about available or current available processing power. Particularly the availability establishing means are adapted to establish if grant of an end user resource request will result in the current available uplink transmission capacity and/or the current available downlink transmission capacity and/or the current available performance capability or capabilities will lead to exceeding a given limit which may correspond to actual current available capacity or capability or a respective limit which is set lower than that.

A given condition may state that if granting of a resource request would result in exceeding the current available limit for one or more of the parameters uplink transmission capacity, downlink transmission capacity, performance capability or capabilities in terms of bandwidth, for example amount of traffic, e.g. expressed as packets per second and/or number of bits per second, number of channels, that can be handled simultaneously, a first signal is generated and provided to resource request decision means. Alternatively the given condition or conditions may state that if granting of a resource request would result in exceeding a precautionary limit below the current maximum limits or one or more of the parameters uplink transmission capacity, downlink transmission capacity, performance capability in terms of bandwidth, for example amount of traffic, e.g. expressed a packets per second and/or number of bits per second, number of channels that can be handled simultaneously, a first signal is generated and provided to the access resource request decision means.

The resource request decision means are particularly adapted to initiate rejection of a request for an access resource request if the first signal is received. Alternatively or additionally, the availability establishing means is adapted to establish if, for a given resource request, the given conditions are fulfilled, and to, if the given conditions are fulfilled, generate and provide a second signal to the resource request decision means, said resource request decision means being adapted to make a decision to, or initiate, grant of the resource request. In a particular embodiment the availability establishing means and the resource decision means are implemented as one common means. In other embodiments the functionalities are split up, the calculation and comparing functionality may be in either of them.

Even more particularly the resource request decision means (or the combined means as referred to above) communicates or comprises priority indicating means indicating priorities for different traffic types or services or service types or categories and are adapted to, e.g. at reception of a first signal, or when the outcome of the establishment is available, determine if the resource request actually is to be rejected or if there is/are any other session or sessions going on with a lower priority, and to, in such a case, initiate or order drop of such lower priority session or sessions and grant the (current) resource request. This of course requires more intelligence in the resource request decision means but it is extremely advantageous in so far it considerably increases the controllability of admission of resources for different types of services. It should be clear that different limits can be set or altered in any desirable manner. Alternatively they are fixed.

The relationships between current available capability or capacity and requested capability and capacity as far as one or more of the above mentioned parameters is concerned can also be estimated and the decision may be based on a probability, of for example 80 or 90 or 95 percent or any appropriate percentage, that the capacity or the capability of either of the parameters will be exceeded in order to activate an action such as making a decision. It may alternatively be based on a given probability, or a given percentage that the available capacity or capability as far as one or more of the above mentioned parameters will not be exceeded and to base the decision thereon. As far as the first and second signals are concerned, it is of course also possible to take a given action in the absence of a signal, e.g. no signal means that the resource request should be granted or, vice versa, be rejected.

Particularly the broadband access node is adapted to establish if, for a given resource request, given conditions are fulfilled, and to, if the given conditions are fulfilled, generate and provide a second signal to the resource request decision means, said resource request decision means being adapted to, upon reception thereof initiate granting of the resource request by informing policy enforcement means.

In another implementation or additionally, the resource request decision means are adapted to, if the given conditions are not fulfilled, generate and provide a message to the end user indicating a reject reason, and possibly contain some information as to what the end user can do, drop another resource or modify the subscription. It may for example also simply indicate reject. The message may be customized, but it may also be a standard message.

Particularly the policy enforcement function is provided in the access node. The policy decision function may also be provided in the access node. Alternatively the policy decision function is provided in an external policy server and the access node is adapted to support a policy control interface for communication with the policy server, at least for unicast resource requests.

The invention also provides for a broadband access network for providing end users with service access offered by service providers which comprises a number of broadband access nodes having one or more of the above mentioned features.

According to the invention a method for controlling end user access to services in a broadband access network is therefore also suggested. It comprises the steps of, at reception of an end user resource request in a broadband access node, in any order; establishing in a first step if accepting the resource request for access to a given service (i.e. a specific service or a service belonging to a specific group) would involve exceeding a given first limit with respect to the current available uplink transmission capacity of the access node, or in other terms, if a condition relating to the relationship between the current available uplink transmission capacity and the required uplink transmission capacity for a given service is fulfilled or not (this is relevant in a corresponding manner for each of the steps discussed below (first or fourth) which, although denoted first, second etc. could be performed in any order).

Subsequently or additionally the method comprises the steps of, establishing, in a second step, if accepting the resource request would involve exceeding a given second limit with respect to the current available downlink transmission capacity of the access node (cf. the discussion above relating to conditions or relationships), and establishing, in a third step, if accepting the resource request would involve exceeding a third and/or a fourth given limit(s) relating to maximum current available performance of the access node.

Subsequently it may comprise the optional steps of establishing if or given conditions concerning the limits are fulfilled or not, e.g. if one limit is more important than another, or if it is allowable that one (or more) specified limit does not have be upheld, etc. Subsequently it comprises the step of, providing information to resource request decision about the outcome of the establishing step (this step can of course not be effected before or inbetween the steps above; the non-significance of order only applies to the earlier steps discussed above); making a decision in the resource request decision means to initiate or provide for grant/reject of the resource request. As discussed above the establishing steps can be performed in different ways.

Particularly the third establishing step comprises; establishing if given bandwidth requirements relating to current available bandwidth are met. Particularly the bandwidth requirements are expressed relating to current available number of IP packets per second and/or the current available number of bits per second for a requested type of service or for a requested specific service.

The method may particularly comprise the step of; establishing separate and different first, second and third limits for multicast and unicast traffic. Particularly, for each service or service category of multicast and/or unicast service, at least a third limit is established, i.e. if both multicast and unicast traffic is allowed, a specific third limit for unicast and a specific third limit for multicast is to be provided.

The method advantageously also comprises the steps of; determining first and/or second and/or third and/or fourth limits as the actual respective maximum available capacity/capability, or alternatively as respective values below the actual respective maximum available capacity/capability values. In a particular implementation the step of making the decision comprises; considering priorities relating to different services or service categories or types such that a lower prioritized service session (already granted or simulataneously requesting grant) can be dropped if a request is received for a higher prioritized service which would involve exceeding one or more of the given limits. More particularly the method comprises the steps of; defining groups of categories of multicast services; assigning each of a number of services to one of the groups of categories; for each group or category of services: defining a specific set of required service attributes of which at least one service attribute is defined indicating required transmission bandwidth. The method may comprise the step of; provisioning, for each end user, a white list specifying which multicast channels the end user is allowed to join; using the information in the white list before or in the establishing steps.

It is an advantage of the invention that an excellent utilization of the resources in a network can be provided. It is also an advantage that a flexible resource control is offered. Further yet it is an advantage that it gets possible to distinguish between services requiring a lot of bandwidth and services which do not, such that requests are not unnecessarily dropped. It is also an advantage that the risk of producing bottlenecks is reduced and that proper delivery of subscribed multicast, and particularly also unicast, services can be provided.

BRIEF DESCRIPTION OF THE DRAWINGS

The invention will in the following be further described, in a non-limiting manner, and with reference to the accompanying drawings, in which.

DETAILED DESCRIPTION

Figure 1:
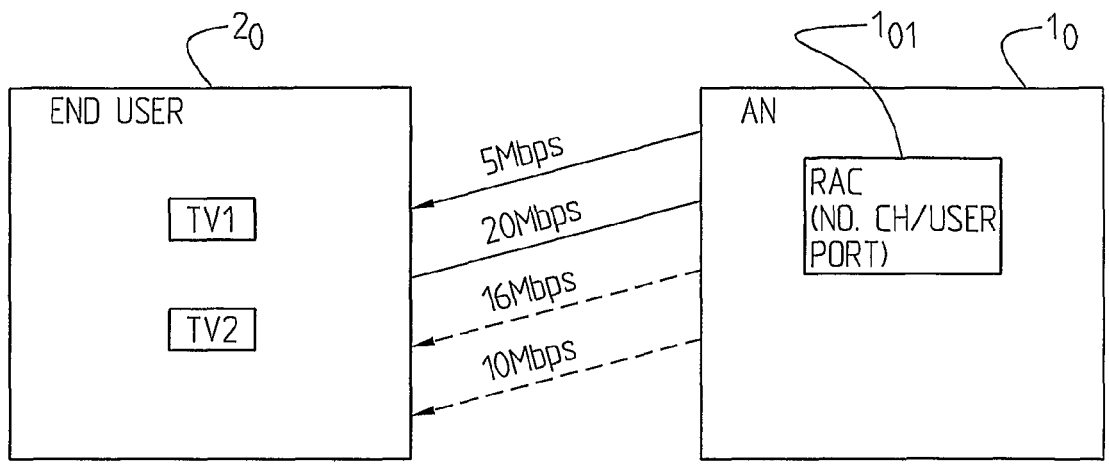
FIG. 1 very schematically illustrates a state of the art access node implementing simple multicast state limiting.

Generally the inventive concept is based on an access node implementing an RAC function (multicast and/or unicast) wherein the required bandwidth for individual services (multicast and/or unicast) is used in the decision as to whether or not allow access to a resource for a particular service. The bandwidth may be expressed in bits per second (bps) and/or IP packets per second (pps).

Using the required resources as parameters, the proposed solution enables calculation or establishment as to whether the delivery or grant of the new request, for example a multicast request, will result in exceeding the limits proposed by the system bottlenecks, and if so, initiate proper actions to prevent malfunction, optimize resource usage and to provide for flexibility and controllability.

Generally the solution can be said to comprise a policy decision functionality or a policy decision function (PDF) and a policy enforcement function (PEF) which can be implemented in different manners. In a basic scenario, both functions are distributed to the individual broadband access node, i.e. any access node having knowledge about the relevant available resources (bottlenecks) and required resources for all or at least a number of different services or service categories. In the following functions, implemented in various manners, are seen as implemented or comprised by the node, but part of the functionality may also be provided externally. As will be seen from the following figures, there are a large number of implementational options.

Generally, from an access node point of view, the following properties of the access network put limitations on the multicast traffic (similar contemplations apply for the unicast traffic): the access node uplink transmission capacity (towards the service provider), in the following also denoted UL TX capacity, the access node downlink (subscriber line) transmission capacity (DL TX capacity), the maximum amount of multicast traffic (packets per second) that the access node can handle and the maximum number of multicast (and, if applicable, unicast respectively) channels that the access node can handle simultaneously.

Generally, at any time the access node keeps track of the available multicast/unicast resources, i.e. the remaining transmission capacity (UL/DL), the number of free multicast/unicast channel entries in the access node memory and the access node processing power (which particularly forms a part of the performance information). For the subscriber line, a specific value or a percentage of the total subscriber line bandwidth can be allocated for multicast traffic by provisioning. In state of the art systems, only the maximum number of multicast channels is considered when evaluating an end user request for e.g. a multicast service. As discussed above this is not sufficient and results in a non-optimal, or even poor usage of resources, increases the risk of producing bottlenecks etc.

Particularly the access node is provided with the available, or contracted bandwidth on the subscriber line. By provisioning, for each multicast (unicast) service, the associated bandwidth, preferably expressed in both bits and packets per second, and the available (multicast/unicast) processing power (pps) of the access node, the node can additionally determine if a, here, multicast request will lead to exceeding the available uplink transmission capacity of the access node, exceed the available downlink (subscriber line) transmission capacity or exceed the, here, multicast performance capabilities of the access node. Depending on if any particular conditions are given or not, particularly if any of these limits will be exceeded as a result of granting access to the requested multicast service, the access node is adapted to take a proper action. In some embodiments exceeding one of the limits might be acceptable, whereas exceeding another is not acceptable etc. Advantageously, however, a condition is that none of the limits should be exceeded. One obvious action is to reject the request, i.e. discard the IGMP (Internet Group Management Protocol) join message from an end user. Another action, which however requires more intelligent functionality in the access node, is to terminate on-going lower prioritized multicast services towards that particular end user and/or towards other end users according to different implementations, in order to make resources available for the new request, on condition that it has a higher priority. In one embodiment, to facilitate configuration of multicast service properties, it may be sufficient to define each service as belonging to one out of a set of predefined multicast/unicast service categories, for example radio channel, IPTV, HD IPTV etc. Each category has a specific set of service attributes, including at least required transmission bandwidth. However other possibilities are of course also possible. It is e.g. possible to take each service separately.

In one particular embodiment, for each end user, a white list is provisioned in the access node specifying exactly which multicast channels the end user is allowed to join. If such a function is present in the access node, the RAC function according to the present invention should be integrated with the white list function.

In specific embodiments of the present invention, the access node may comprise RAC means or an RAC function which handles exclusively multicast based services. Alternatively it handles only unicast services, or it handles both multicast and unicast services. If the RAC function according to the present invention also handles non-multicast based services in addition to multicast based services, which require a guaranteed bandwidth, for example Video-on-Demand and gaming services, this preferably requires interfacing the access node to a policy server, cf. FIGS. 3 and 7 below.

FIG. 1 shows a state of the art access node 10 comprising an RAC function $1_{01}$, i.e. the required QoS for multicast traffic is implemented by limiting the number of multicast channels per end user. This is for example described in the DSL forum TR-101 technical report discussed earlier. It is supposed that an end user $2_0$ is configured to receive only two multicast streams and it is not possible to distinguish for example between a 10 Mbps HDTV channel and a 32 kbps radio channel. It is here supposed that the access link capacity is 20 Mbps. TV1 channel uses 5 Mbps and if a new 12 Mbps channel is requested, the new channel is allowed. If however subsequently a 64 kbps channel is requested, it will not be allowed since the user is limited to receive only two multicast streams. Similarly, if a new 16 Mbps TV stream is requested, both streams, i.e. the old 5 Mbps stream and the 16 Mbps stream will be allowed, but affected.

Figure 2:
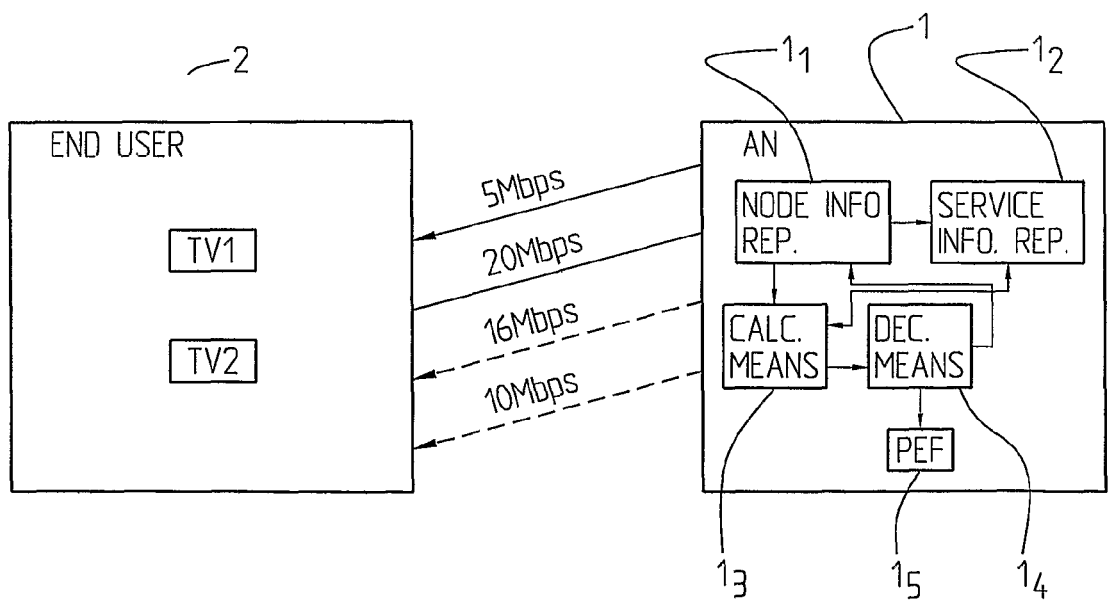
FIG. 2 is a schematical block diagram of an access node in which the inventive concept is implemented.

FIG. 2 is a block diagram describing an end user 2 and an access node 1 comprising an RAC functionality comprising a node information repository $1_1$ holding or calculating current node parameters, for example UL TX capacity, DL TX capacity, performance related (bandwidth) parameters and possible the maximum number of channels of a specific type, for example multicast, that the access node can handle simultaneously. The access node 1 further comprises service request or service information repository $1_2$ for holding service or service category related parameters as discussed above including required bandwidth for respective services or service categories. The access node further comprises calculating means or availability establishing means $1_3$ for establishing if granting a service resource request would lead to any of the current node parameters being exceeded or whether any conditions set up relating to the different parameters, would not met etc. Based on the result obtained in the calculation or availability establishing means $1_3$, decision means $1_4$ are adapted to make the appropriate decision and provide the outcome of the decision to a policy enforcement function PEF $1_5$ for enforcement of the decision made. The decision means may of course also be seen as incorporated in or associated with the calculating means, $1_3$. Different implementations are possible.

It is here e.g. supposed that the access link capacity is 20 Mbps, that the TV stream to TV1 needs 5 Mbps and that there are requests for a new TV stream to TV2 requiring 16 Mbps and a new TV stream to TV2 requiring 10 Mbps. In this implementation the 16 Mbps stream is rejected whereas the 10 Mbps stream is accepted, hence not resulting in any problems in any of the allowed streams.

Figure 3:
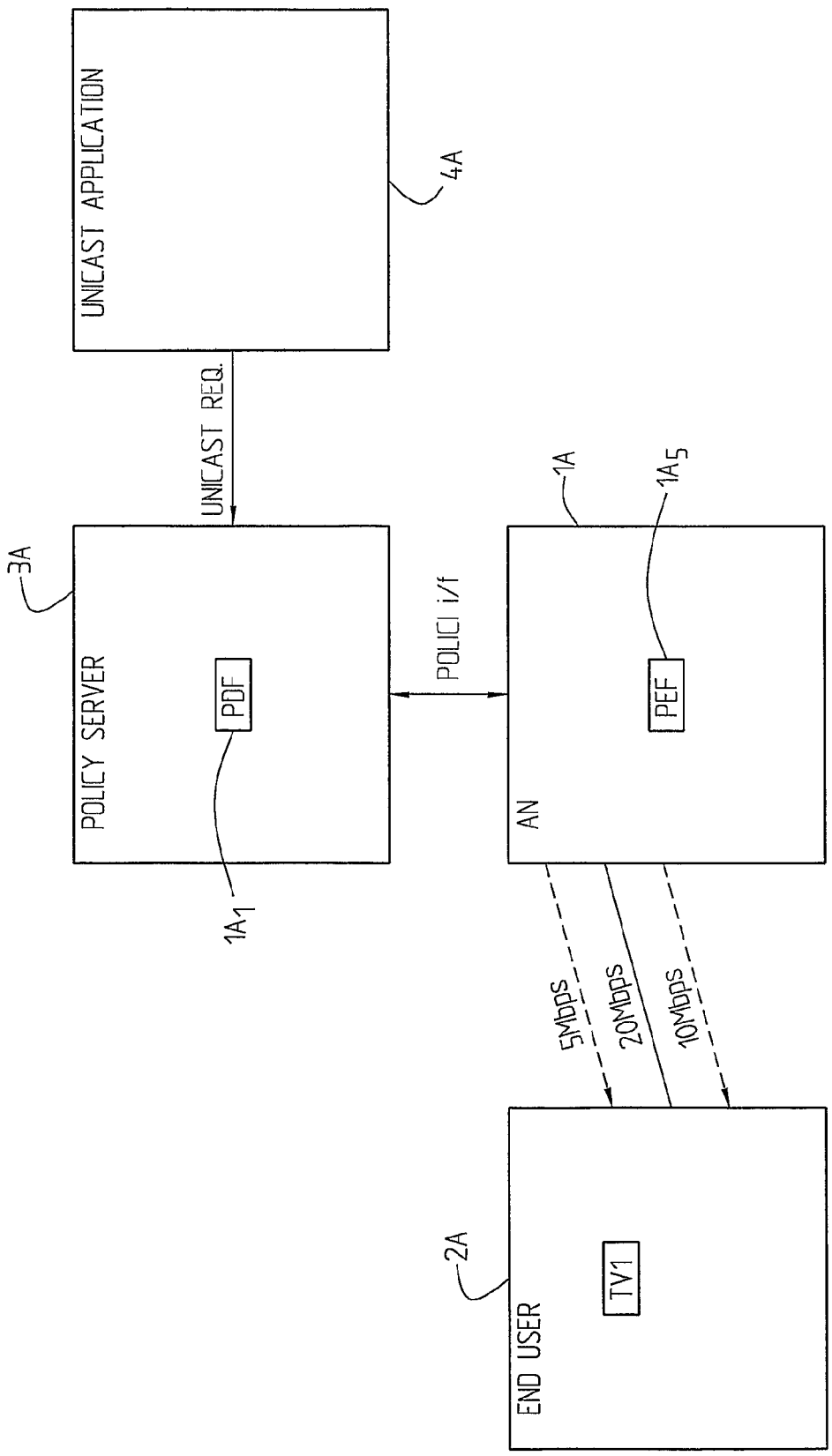
FIG. 3 is a schematical block diagram illustrating an access node implementing the inventive concept for multicast as well as unicast requests.

FIG. 3 shows an access node 1A comprising the PEF function $1A_5$ whereas the PDF functionality $1A_1$ is provided in a policy server 3A receiving a unicast request from unicast application 4A. End user 2A has access to a multicast 5 Mbps TV stream to TV1. Thus, here PDF $1A_1$ is located in a policy server 3A and uses a policy control interface towards the access node 1A which also is particularly relevant when dealing with a high and dynamic range of services, for example Video-on-Demand, gaming, video conferencing etc.

It is e.g. supposed that the access link capacity is 20 Mbps and that a new 10 Mbps unicast stream to TV2 is requested. AN 1A takes both multicast and requested unicast (via the policy server) into account when handling resources for guaranteed services. Particularly a given bandwidth is allocated for multicast services and another for unicast services etc.

Figure 4:
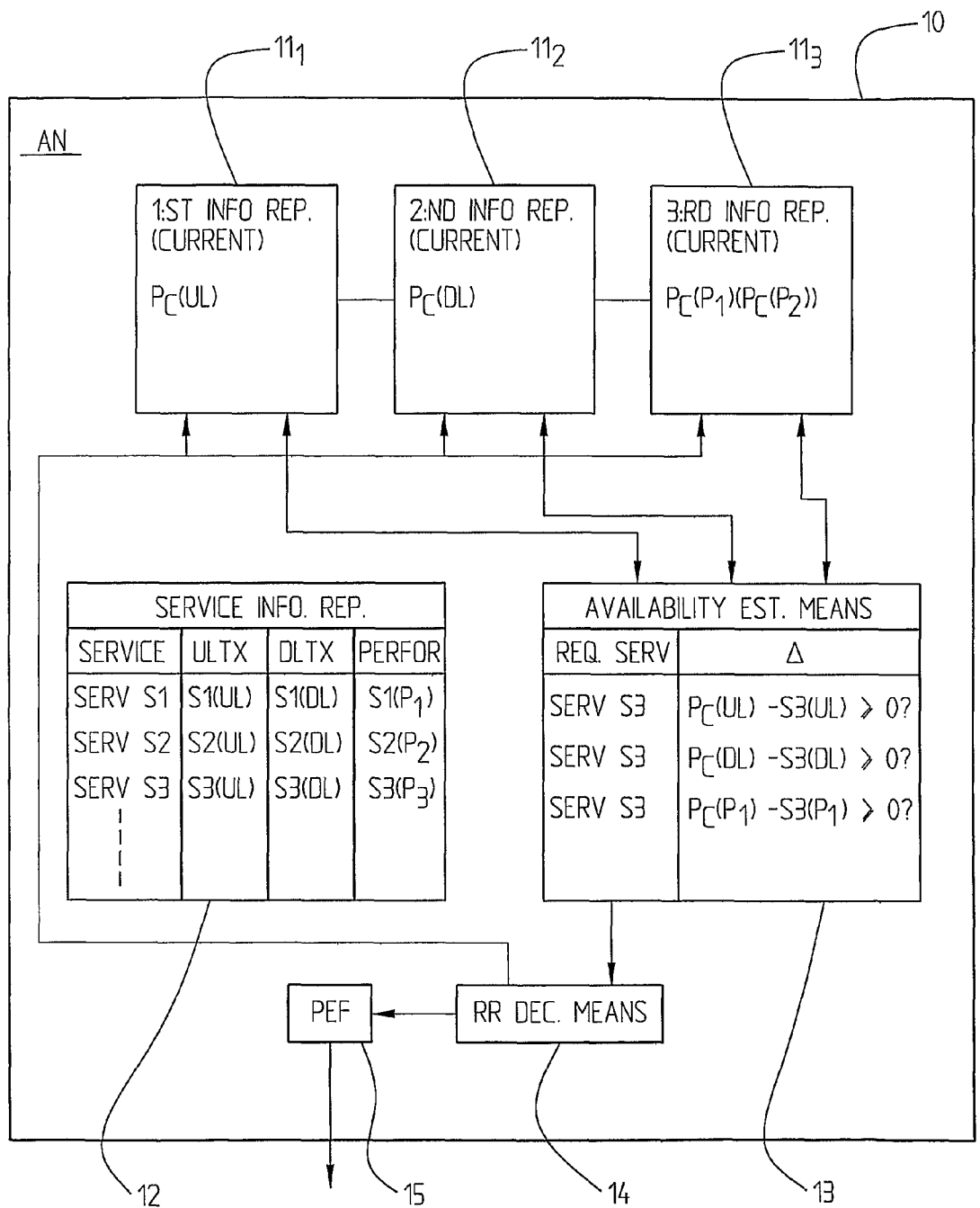
FIG. 4 is a block diagram of an access node according to a first embodiment of the present invention.

FIG. 4 shows one particular implementation of an access node AN 10. AN 10 here comprises a first information repository $11_1$ for holding information relating to the current available uplink transmission capacity or of the parameter $P_c(UL)$, a second information repository $11_2$ for holding current information relating to a second access node parameter, the DL TX capacity, parameter $P_c(DL)$, and a third information repository $11_3$ for holding current information relating to the maximum available performance which may be expressed as one or more parameters, here indicated as a first parameter $P_c(P_1)$, and optionally a second parameter ($P_c(P_2)$), for example relating to the bandwidth expressed as pps and/or bps as discussed above.

The access node further comprises a service information repository 12 for holding information relating to different services, here illustrated as information for the specific services S1, S2, S3 relating to UL TX, DL TX and a performance parameter P. Here it is supposed that UL TX for S1 is S1 (UL), DL TX for S1 is S1(DL) and the performance is indicated as S1(P) etc. The access node 10 further comprises availability establishing means 13 establishing or calculating, if, for a given resource request, here S3, the determined conditions are fulfilled. Here the conditions simply are that the current values of the node parameters as referred to above are not exceeded and hence a calculation is performed, Pr(UL)−S3 (UL)≧0?, $P_c$(DL)−S3 (DL)≧0?, $P_c(P_1)$−S3($P_1$)≧0?. The outcome of the establishments or calculations in the availability establishing means 13 is used in resource request decision means 14 where a appropriate decision is made. In one implementation a signal is provided if the conditions are fulfilled, in another if at least one of the conditions is not fulfilled, in still another implementation different signals are provided depending on whether the conditions are fulfilled or not.

In the resource request decision means 14 further conditions may be made, more or less intelligent handling may be provided for etc. In the most straightforward or simplest embodiment, if for every parameter there would be capability/capacity enough, a decision would be made to grant the resource request and otherwise to reject resource request.

Different alternative ways of making the decision are possible, including more or less intelligent handling. The decision made is then enforced by the PEF (Policy Enforcement Function) 15. Hence, the first, second and third information repositories $11_1$, $11_2$, $11_3$ all the time keeps information about the current value of the respective parameters and for the respective services, the relevant required parameter values are introduced into the table 12. Information from the first, second and third information repositories $11_1$, $11_2$, $11_3$ and the information of the service repository 12 is provided to the availability establishing means 13 when a resource request is received in AN 10. In the availability establishing means the appropriate calculations are performed, and provided to resource request decision means 14 which provide the result of the PEF 15. In order to keep the first, second and third information repositories updated, the information may be provided from the RR (Resource Request) decision means 14 when a decision is made. Alternatively this information may be provided from PEF 15.

It should be clear that instead of parameter values for the respective services, the services could be seen as belonging to different categories for which given parameter requirements apply.

Figure 5:
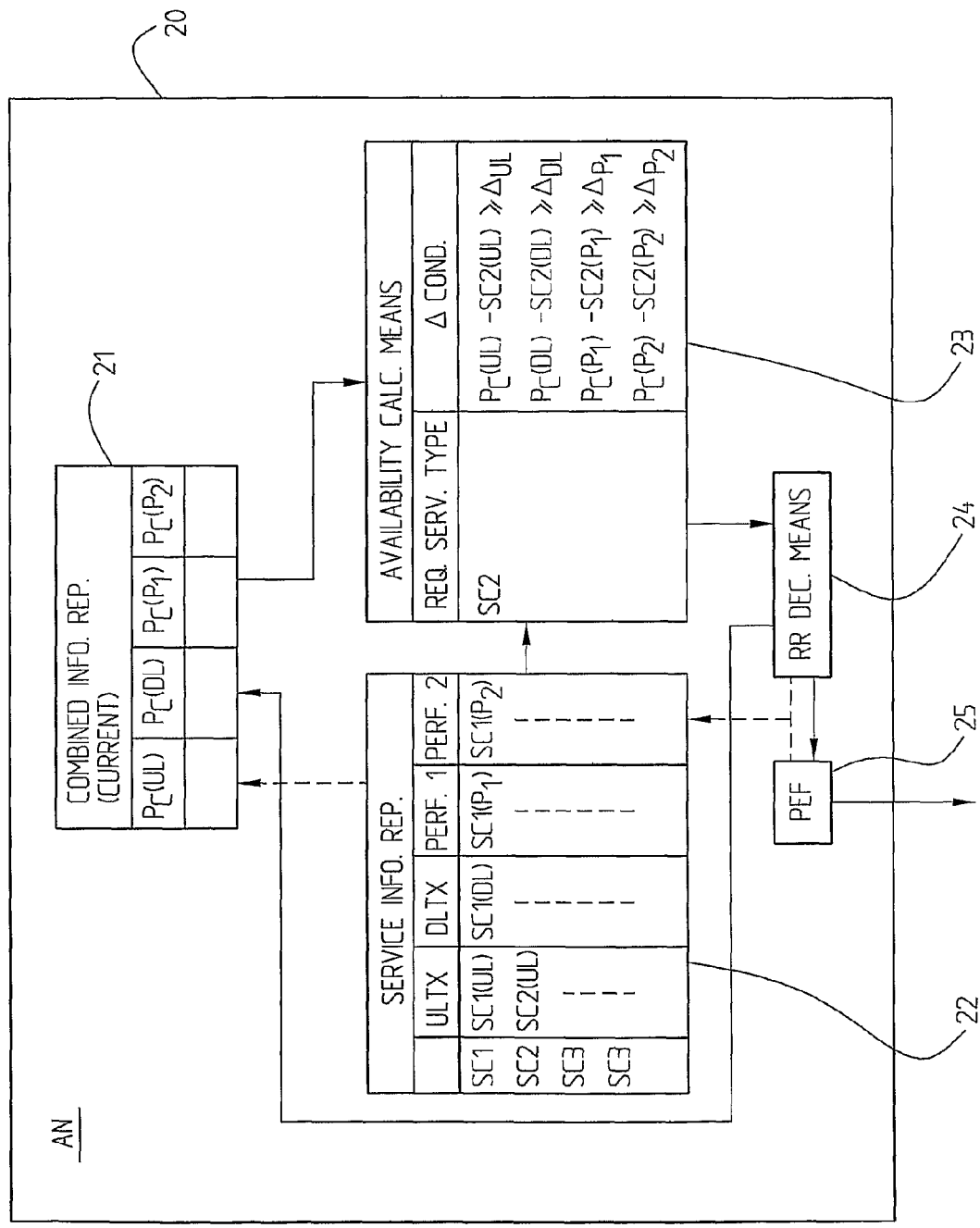
FIG. 5 is a block diagram of an access node according to a second embodiment of the present invention.

FIG. 5 shows an alternative implementation of an access node 20 wherein the parameter values for the access node are contained in a combined information repository 21. For the performance two parameters $P_1$, $P_2$ are used. The service information repository 22 is modified to comprise or hold information relating to service categories, here SC1, SC2, SC3, SC4. Information from the combined information repository 21 and from the service information repository 22 is provided to availability calculation means 23 upon reception of a service resource request; here it is supposed that a resource request is received for a service belonging to a service category SC2. A condition is given indicating that one or more of the differences calculated as in the embodiment described with reference to FIG. 4 should exceed a given limit Δ instead of zero. This is illustrated as $\Delta_{UL}$, $\Delta_{DL}$, $\Delta_{P1}$, $\Delta_{P2}$. Of course one or more of the difference values may be zero. In FIG. 4, the outcome is directly or indirectly provided to RR decision means 24 by means of a signal when a decision is made, information about which is transferred to PEF 25 which enforces the decision. The outcome of the decision with relevant parameter values is provided to the combined information repository 21 for updating the same. The decision or the information of importance for the information repositories, i.e. if for example a requested resource is granted, may be provided directly from RR decision means 24, or via PEF or from RR decision means 24 via the service information repository 22.

Figure 6:
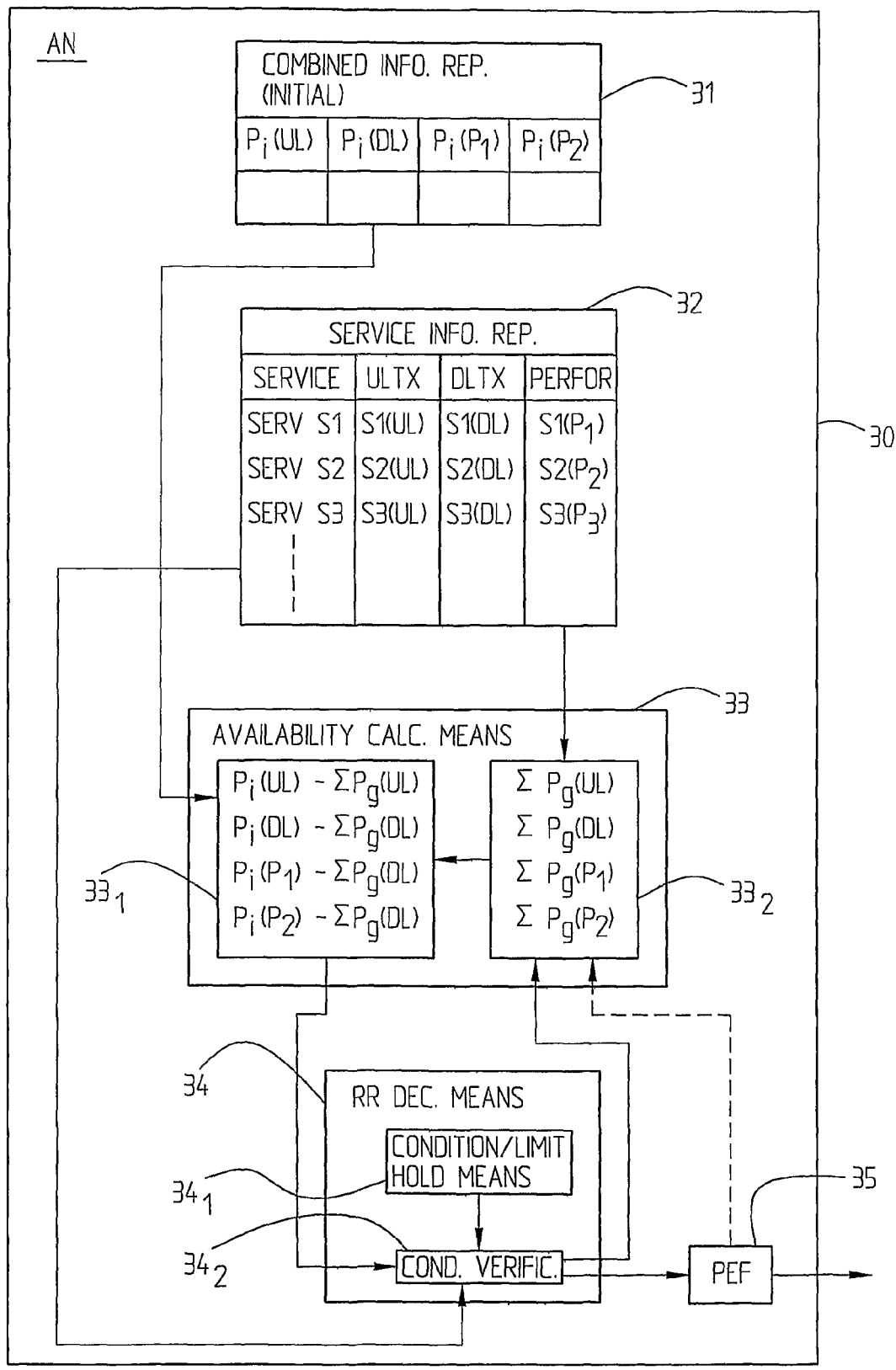
FIG. 6 is a block diagram of an access node according to a third embodiment of the present invention.

FIG. 6 shows still another implementation of an access node, AN 30. Also AN 30 is supposed to contain a combined information repository, but in this case the combined repository 31 holds initial parameter values concerning the available capacity or capability indicated through index i. In other aspects the denotations in the table are the same as in FIG. 5. The service information repository is here similar to that of FIG. 4, 32, but alternatively it may be similar to the service information repository of FIG. 4 or it may be constructed in any other appropriate manner. The availability calculation means 33 comprises first calculation means $33_1$ for calculating the difference between the initial parameter values and the total granted capacity or capability; for each respective parameter the information is collected in adding means $33_2$, and the first calculating means $33_1$ are continuously updated from the second calculating means $33_2$ and here the current values are held by the availability calculating means 33 instead of by the node information repository. The resource request decision means 34 are here also slightly modified, although they may of course be implemented as the resource request decision means as described with reference to FIG. 4 or 5, the implementation still having the other features disclosed in FIG. 6.

RR decision means 34 comprise condition/limit holding means 34, for holding information about the conditions that should be fulfilled when comparing the current available capabilities or capacities with any limits that might be given. A verification as to whether the conditions are met or not is performed in condition verification means $34_2$, where the resource request is received from the service information repository 32 as well as the respective differences between the initial parameter values of node and the sum of the parameter values for granted resources to see if the given conditions are met/not met or if any given limits are exceeded or not. The result of the condition verification means $34_2$ is then transferred to PEF 35 which enforces the decision. The result of the condition verification is particularly provided to the total granted capacity holding means $33_2$ in order to keep the values in the first calculating means $33_1$ updated. In other respects the functioning is similar to that described above.

Figure 7:
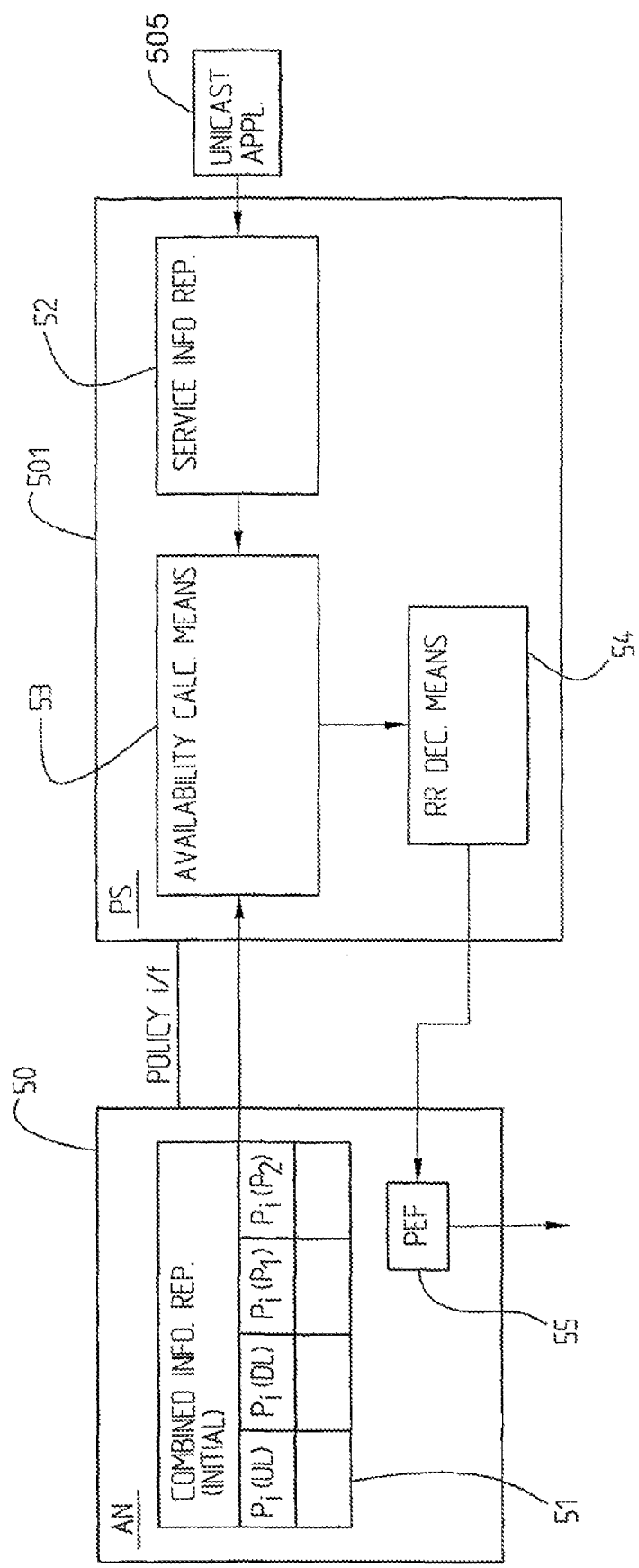
FIG. 7 is a block diagram of an access node according to a fourth embodiment of the present invention wherein the PEF functionality is located externally of the access node, particularly for unicast traffic.

FIG. 7 shows still another implementation of the inventive concept. Here unicast resource requests from unicast application 505 are handled in a policy server 501 communicating over a policy interface with the access node 50. AN 50 may comprise a combined information repository 51 holding initial information as discussed with reference to FIG. 6. In that case the provisioning of the corresponding current information is provided to availability/calculating means 53 provided in policy server 501. Alternatively the combined information repository holds current parameter values. In one implementation the policy server holds service information repository 52 as discussed above and resource request decision means 54. PEF function 55 is provided in AN 50. The unicast service request is received from unicast application 505, the corresponding service parameter information is provided to availability/calculating means 53 which, for performing the calculation, fetches the initial (or current) access node parameter information from the combined information repository 51. This means that the function of establishing the current values is performed in the availability calculating means or alternatively in the combined information repository. They may also be implemented as one combined, common entity. This is applicable to any one of the embodiments described above. In any case the outcome is provided to RR decision means 54 which in different implementations contains or does not contain condition holding and verification means etc. as described with reference to FIG. 6. When a decision is made, the outcome is provided to PEF 55 which is provided in AN 50. In this case the PDF functionality can be seen as distributed between the AN 50 and the PS 501. Multicast services can be handled similarly or through the provisioning of a specific PDF functionality in the access node. Hence, the policy server may particularly signal the requested resources to the access node which can determine the proper action, accept or reject, based on the current resource situation for both multicast based services and non-multicast based services. This means that the decision means can be provided either in the policy server or in the access node itself.

Relevant to any one of the embodiments, the access node is in particular embodiments able to provide a graceful reject of an end user resource request. If for example an IGMP join message is rejected for an IPT service, the end user can instead be set to receive a low bandwidth stream which either may be generated locally in the access node or remotely, with a customized text message indicating the reasons for the service request rejection and possible actions to avoid this rejection in future, for example relating to upgrading subscription level etc.

It should be clear that in any of the described embodiments, the decision means may be provided with a functionality to base a reject decision on the priority of the requested service with respect to already granted services such that if other already granted services have a lower priority, one or more such services might be terminated and this may be done on end user basis or on a number of end users or on all end users.

Figure 8:
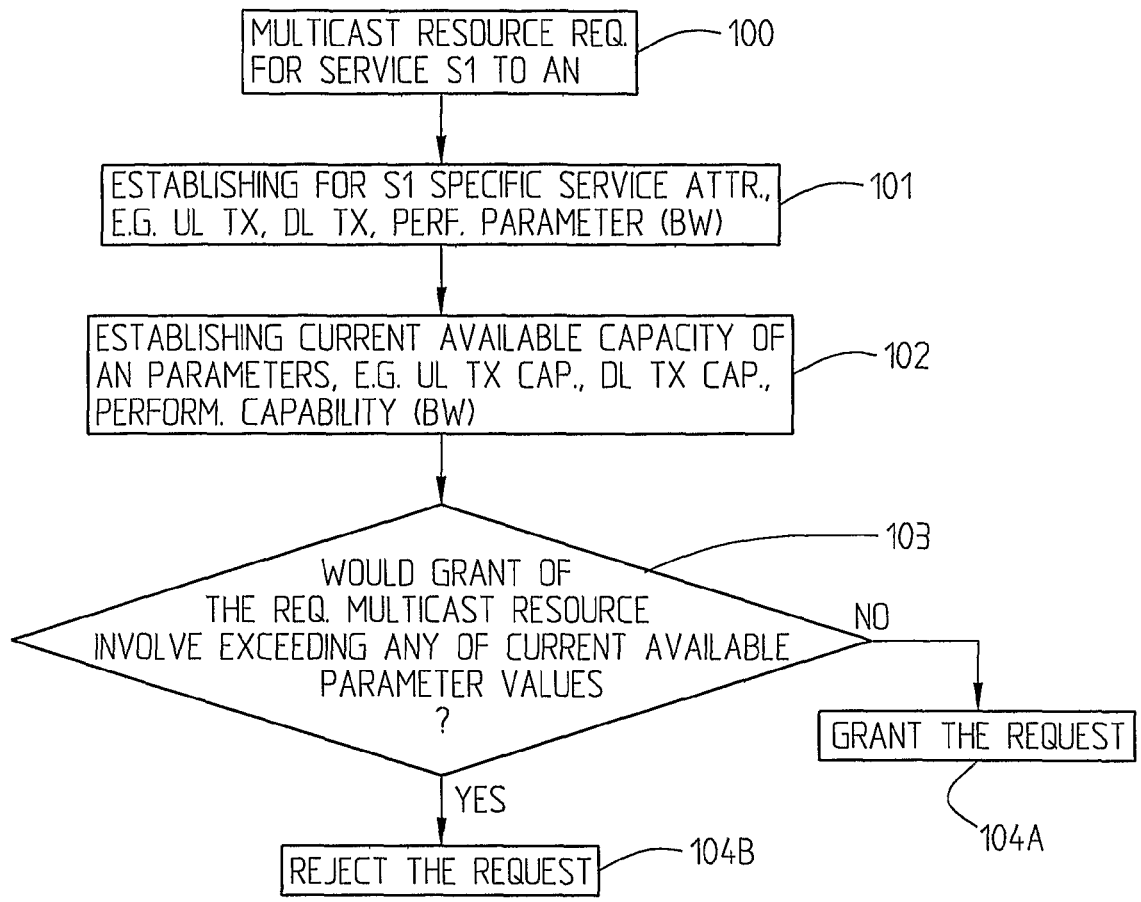
FIG. 8 is a schematical flow diagram describing an implementation of the inventive procedure.

FIG. 8 is a flow diagram which in a simplified manner describes one implementation of the inventive procedure. First a multicast resource request for a service is received an AN, 100, from an end user. In AN, i.e. in the PDF function incorporated in or associated with AN, it is established which are the values of the for S1 required specific service attributes, for example concerning UL TX, DL TX, performance parameters, for example the required bandwidth expressed in bps and/or pps, 101. It is established which is the current available capacity of the corresponding respective AN parameters, particularly current UL TX capacity, current DL TX capacity and current performance capability (available bandwidth in pps and/or bps), 102. It should be clear that steps 101, 102 could be performed in any order or more or less simultaneously. Then it is examined if grant of the multicast resource request would involve exceeding one or more of the current available parameters, 103. If not, the resource request can be granted, 104A, otherwise, the request is to be rejected, 104B.

Figure 9:
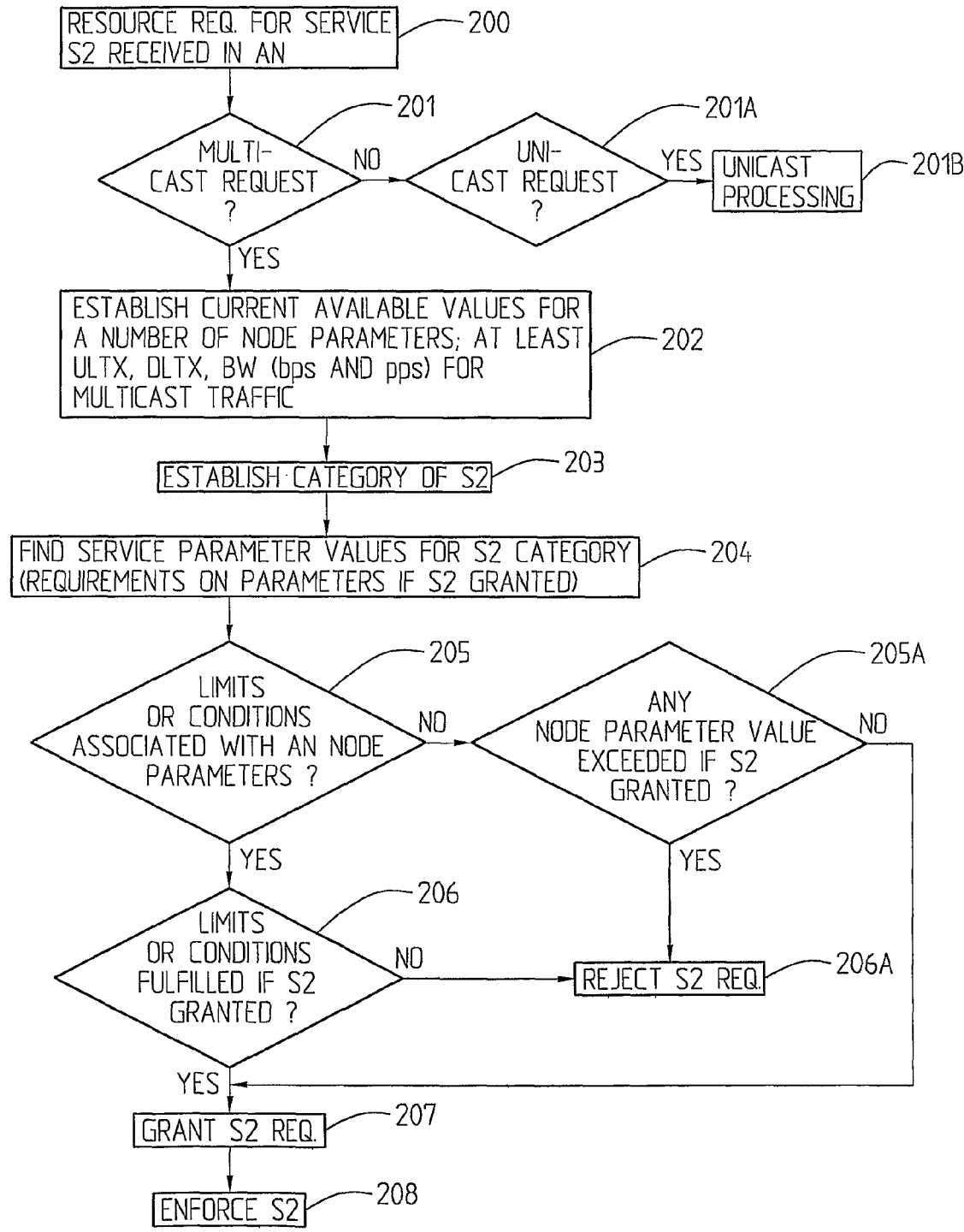
FIG. 9 is a flow diagram describing another implementation of the inventive concept.

FIG. 9 describes the procedure according to another implementation of the inventive concept. A resource request for a service denoted S2 is received in an AN, 200. It is supposed that AN can handle multicast as well as unicast requests. Thus it is established if it is a multicast request, 201. If not, it is established if it is a unicast request, 201A. If yes, it is proceeded with unicast processing 201B for example as discussed with references to FIG. 7. Generally it is similar to the multicast processing as described below. If on the other hand it is established in step 201 that it is a multicast request, the current available values for a number of node parameters are established, at least UL TX, DL TX and available bandwidth for example expressed in bps and pps or either of them for multicast traffic, 202. Subsequently (before step 202 or simultaneously) the category of S2 is established, 203, here supposing an embodiment in which services are assigned to different service categories, which of course not is necessary for the functioning of the embodiment as described with reference to FIG. 9. Then the service parameter values for the S2 category are established, 204. Subsequently, in this embodiment, it is established if there are any limit or conditions associated with the AN node parameters, 205. If not, the conditions are taken to be that no parameter value is allowed to be exceeded if S2 is granted, 205A, which is examined. If yes, the S2 resource request is rejected, 206A; if not, the S2 request is granted, 207, and S2 is enforced, 208.

If the on the other hand is established that particular limits or conditions are associated with the AN node parameters, it is established if the limits or conditions would be fulfilled if S2 were to be granted, 206. If not, the S2 resource request is rejected, 206A, otherwise it is granted, and enforced, corresponding to steps 207, 208.

Figure 10:
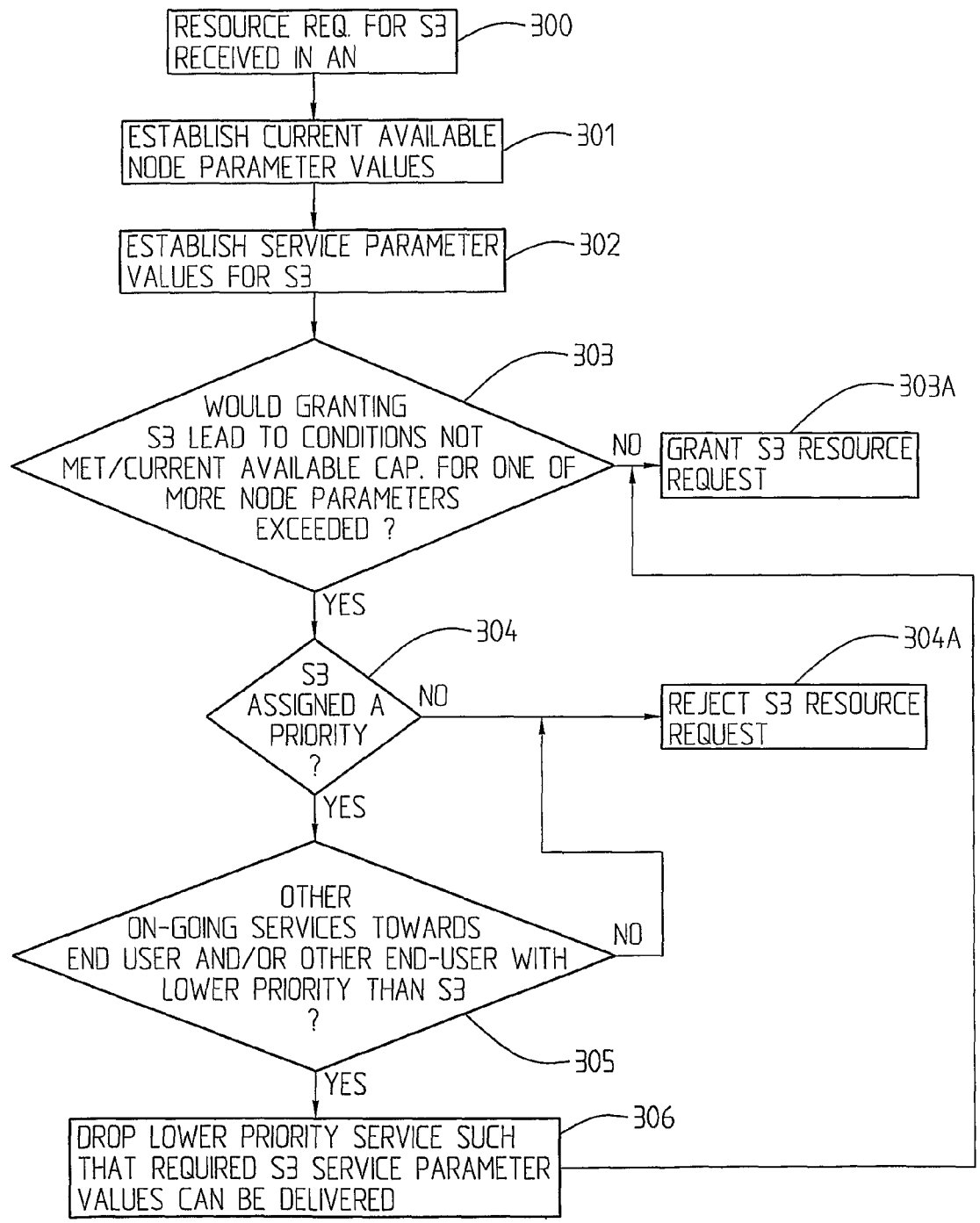
FIG. 10 is a flow diagram illustrating a further specific implementation of the inventive concept including an extended functionality to enable taking service priorities into account.

In still another embodiment illustrated in FIG. 10, it is supposed that a resource request for a service S3 is received in an AN, 300. As discussed above, the current available node parameter values are established, 301, and the service parameter values for S3 are established, 302; as above in any order or simultaneously. Then it is established if granting of S3 would lead to any conditions not being met; e.g. if the current available capacity or capability would be exceeded for one or more node parameters, 303. If not, it is supposed that the S3 resource request is granted, 303A, and enforced. If one or more node parameter values would be exceeded, it is established if S3 is assigned a priority, 304. If not, the S3 resource request is rejected, 304A. If S3 however is assigned a priority, it is examined whether there are other on-going, i.e. already granted, services towards the end user and/or towards any other end user, which have a lower priority than S3, 305. If not, the S3 resource request is rejected, 304A. Otherwise, one or more lower priority service or services is/are dropped such that the required S3 service parameter values can be properly delivered while still meeting the node requirements, 306. It should be noted that of course appropriate other services are dropped such that all parameter values can be granted that are required by S3. The decision made is then enforced (not shown).

It should be clear that the invention can be varied in a number of ways within the scope of the appended claims and the invention is not limited to the specifically illustrated embodiments. Particularly the different features that are shown relating to different embodiments can be combined in any appropriate manner in various embodiments. The inventive concept applies to multicast and/or unicast traffic.

The invention claimed is:

1. An access node for controlling access by end users to services over communication channels of given types, said access node utilizing an internal or external resource admission control mechanism to control end user admission to channel resources, said access node comprising:
policy decision and enforcement means comprising:
first information holding means for collecting and/or holding information about a currently available transmission capacity of the access node on an uplink channel towards a service provider;
second information holding means for collecting and/or holding information about a currently available transmission capacity of a downlink subscriber line;
third information holding means for collecting and/or holding information about a currently available maximum performance of the access node;
service-related information holding means for providing, for each requested unicast and multicast Internet Protocol (IP) session requiring guaranteed network capacity, information about the capacity and performance service requirements of the requested sessions;
a processor for calculating, when the access node is handling multiple existing IP sessions, whether the service requirements of each requested unicast and multicast IP session requiring guaranteed network capacity, when added to the service requirements of the existing IP sessions, fulfill a given condition or conditions in relation to currently available uplink/downlink capacity and currently available performance capability of the access node, if each requested unicast and multicast IP session is granted; and
resource request decision means for granting or rejecting an end user resource request for each unicast and multicast IP session, based on a result output by the processor.

2. The access node according to claim 1, wherein the first, second, and/or third information holding means are implemented in a combined information collecting and/or holding means with a plurality of different tables for each means.

3. The access node according to claim 1, wherein the first information holding means holds information about total initial available transmission capacity on the uplink and collects information relating to changes in capacity to establish the currently available uplink transmission capacity.

4. The access node according to claim 1, wherein the second information holding means holds information about total initial available transmission capacity on the downlink and collects information relating to changes in capacity to establish the currently available downlink transmission capacity.

5. The access node according to claim 1, wherein the third information holding means holds information about total initial available performance and collects information relating to changes in performance to establish the currently available amount of performance.

6. The access node according to claim 1, wherein the performance comprises information about available bandwidth.

7. The access node according to claim 6, wherein the information about available bandwidth comprises information about the number of IP packets per second and/or information about the number of available bits per time unit.

8. The access node according to claim 6, wherein the performance information additionally comprises information about the number of communication channels the access node is capable of handling simultaneously.

9. The access node according to claim 1, wherein the performance information comprises information about available processing power.

10. The access node according to claim 1, wherein the processor determines whether granting of an end user resource request would result in exceeding predefined limits for the uplink transmission capacity, the downlink transmission capacity, or the performance capability of the access node.

11. The access node according to claim 10, wherein the processor sends a first signal to the resource request decision means when granting of an end user resource request would result in exceeding the predefined limit for the uplink transmission capacity, the downlink transmission capacity, or the performance capability of the access node.

12. The access node according to claim 10, wherein the processor sends a first signal to the resource request decision means when granting of an end user resource request would result in exceeding a precautionary limit lower than the predefined limit for the uplink transmission capacity, the downlink transmission capacity, or the performance capability of the access node.

13. The access node according to claim 11, wherein the processor sends a second signal to the resource request decision means when granting of an end user resource request would not result in exceeding the predefined limit for the uplink transmission capacity, the downlink transmission capacity, or the performance capability of the access node.

14. The access node according to claim 13, wherein the resource request decision means initiates rejection of a request for an resource request if the first signal is received, and initiates grant of the request if the second signal is received.

15. The access node according to claim 13, wherein the resource request decision means includes means for determining priorities for different service types, wherein when the first signal is received, the resource request decision means determines whether sessions with lower priority can be dropped to enable the resource request to be granted.

16. The access node according to claim 1, wherein the resource request decision means includes means for generating and sending a message to the end user indicating a reject reason when the resource request is rejected.

17. The access node according to claim 1, wherein the policy decision means is provided in an external policy server, and the policy enforcement means is provided in the access node.

18. A method for controlling end user access to services in a broadband access network, said method comprising the steps of:
- receiving in an access node, end user resource requests to establish unicast and multicast Internet Protocol (IP) sessions requiring guaranteed network capacity;
- determining by the access node, whether accepting the resource request for each unicast and multicast IP session in addition to already existing IP sessions being handled by the access node would involve exceeding a given first limit with respect to a currently available uplink transmission capacity of the access node;
- determining by the access node, whether accepting each resource request would involve exceeding a given second limit with respect to a currently available downlink transmission capacity of the access node;
- determining by the access node, whether accepting each resource request would involve exceeding a given third limit with respect to a maximum current available performance of the access node;
- deciding by a resource request decision mechanism in the access node, whether to grant or reject each resource request based on results of the determining steps; and
- enforcing the decision made in the resource request decision mechanism.

19. The method according to claim 18, wherein the step of determining whether accepting the resource request would involve exceeding a given third limit with respect to a maximum current available performance of the access node includes determining whether given bandwidth requirements relating to current available bandwidth in the access node are met.

20. The method according to claim 18, wherein the first, second, or third limits are different for unicast and multicast traffic, and the determining steps include separately determining whether the limits are exceeded for unicast and multicast requests.

21. The method according to claim 18, further comprising setting the first, second, and third limits at levels below the actual respective maximum available capacity of the uplink, downlink, and access node.

22. The method according to claim 18, wherein the deciding step includes considering priorities relating to different services such that a lower prioritized service session can be dropped if a resource request is received for a higher prioritized service that would involve exceeding at least one of the limits.

23. The method according to claim 18, further comprising the steps of:
- defining groups or categories of multicast services;
- assigning each of a number of services to one of the groups or categories; and
- defining a specific set of required service attributes of which at least a service attribute is defined indicating required transmission bandwidth.

24. The method according to claim 23, further comprising, before the establishing steps, the steps of:
- provisioning, for each end user, a white list specifying which multicast channels the end user is allowed to join;
- rejecting the end user request and stopping the method if a requested multicast channel is not on the white list; and
- proceeding with the method if the requested multicast channel is on the white list.

* * * * *

UNITED STATES PATENT AND TRADEMARK OFFICE
CERTIFICATE OF CORRECTION

PATENT NO. : 8,111,714 B2
APPLICATION NO. : 12/441439
DATED : February 7, 2012
INVENTOR(S) : Melsen et al.

Page 1 of 1

It is certified that error appears in the above-identified patent and that said Letters Patent is hereby corrected as shown below:

In Column 8, Line 44, delete "10" and insert -- $1_0$ --, therefor.

In Column 9, Line 63, delete "Pr" and insert -- $P_c$ --, therefor.

In Column 11, Line 18, delete "34," and insert -- $34_1$ --, therefor.

Signed and Sealed this
Twenty-fourth Day of April, 2012

David J. Kappos
*Director of the United States Patent and Trademark Office*